E. W. MILLER.
SAFETY DEVICE FOR EXTRACTORS.
APPLICATION FILED NOV. 23, 1916. RENEWED JAN. 10, 1920.

1,352,827.

Patented Sept. 14, 1920.
9 SHEETS—SHEET 3.

Fig. 4.

ERNEST W. MILLER INVENTOR.

BY Brockett and Hyde

ATTORNEYS.

E. W. MILLER.
SAFETY DEVICE FOR EXTRACTORS.
APPLICATION FILED NOV. 23, 1916. RENEWED JAN. 10, 1920.

1,352,827.

Patented Sept. 14, 1920.
9 SHEETS—SHEET 5.

ERNEST W. MILLER INVENTOR.

BY Brockett and Hyde

ATTORNEYS.

E. W. MILLER.
SAFETY DEVICE FOR EXTRACTORS.
APPLICATION FILED NOV. 23, 1916. RENEWED JAN. 10, 1920.

1,352,827.

Patented Sept. 14, 1920.
9 SHEETS—SHEET 7.

INVENTOR.
ERNEST W. MILLER
BY Brockett and Hyde
ATTORNEYS.

E. W. MILLER.
SAFETY DEVICE FOR EXTRACTORS.
APPLICATION FILED NOV. 23, 1916. RENEWED JAN. 10, 1920.

1,352,827.

Patented Sept. 14, 1920.
9 SHEETS—SHEET 8.

ERNEST W. MILLER INVENTOR.

BY Brockett and Hyde

ATTORNEYS.

UNITED STATES PATENT OFFICE.

ERNEST W. MILLER, OF NORWOOD, OHIO, ASSIGNOR TO THE AMERICAN LAUNDRY MACHINERY COMPANY, OF CINCINNATI, OHIO, A CORPORATION OF OHIO.

SAFETY DEVICE FOR EXTRACTORS.

1,352,827.      Specification of Letters Patent.      Patented Sept. 14, 1920.

Application filed November 23, 1916, Serial No. 133,041. Renewed January 10, 1920. Serial No. 350,682.

*To all whom it may concern:*

Be it known that I, ERNEST W. MILLER, a subject of the King of Sweden, residing at Norwood, in the county of Hamilton and State of Ohio, have invented certain new and useful Improvements in Safety Devices for Extractors, of which the following is a specification.

This invention relates to extractors, such as are used for extracting liquids and moisture from cloth, woven fabrics, garments, pulverized or granulated materials, or other substances. The invention has particular relation to that class of machines in which the articles to be treated are placed in a basket or container which is rotated at a high rate of speed to drive off or expel the moisture or liquids by centrifugal force.

Some of the more important objects of the invention are to safeguard the machine by insuring a careful and thorough observation or inspection of the machine by the operator at the time of starting to see that the load is evenly balanced or distributed and that the various parts of the machine are in working position; to safeguard the operator by preventing him from starting the machine unless it is in proper condition for starting and safe for running; and to automatically stop the machine after the lapse of a period of time whose duration is under the selective control of the operator. Further objects of the invention are to insure release of the brake in starting the machine; to lock the cover in closed position while the machine is running and absolutely prevent starting or operation of the machine whenever the cover is open; to hold the brake released while the machine is running; and to apply said brake and cut off the power at the proper time to stop the machine.

Further objects of the invention are in part obvious and in part will appear more in detail hereinafter.

The invention comprises the extracting machine hereinafter described and claimed.

The machine shown in the drawings comprises a suitable frame 1 having a base 2 supporting the casing or jacket 3 which incloses the rotating basket 4 supported by the vertical shaft 5. On said shaft is the combined pulley and brake drum 6 rotated by the belt 7 driven by pulley 8, said latter pulley being operated by any suitable power source, such as the electric motor 9.

Between the two halves of the belt, and opposite drum 6, is a brake shoe 10 carried by a lever 11 pivoted at 12 to the stationary frame and extending forwardly around the shaft 5 to the front of the machine where it is connected by an adjustable link 13 to one arm of a foot treadle 14. A tension spring 15 attached to the lever 11 tends to move the brake shoe into engagement with the drum and elevate the foot plate 16 of the treadle.

Figure 1:
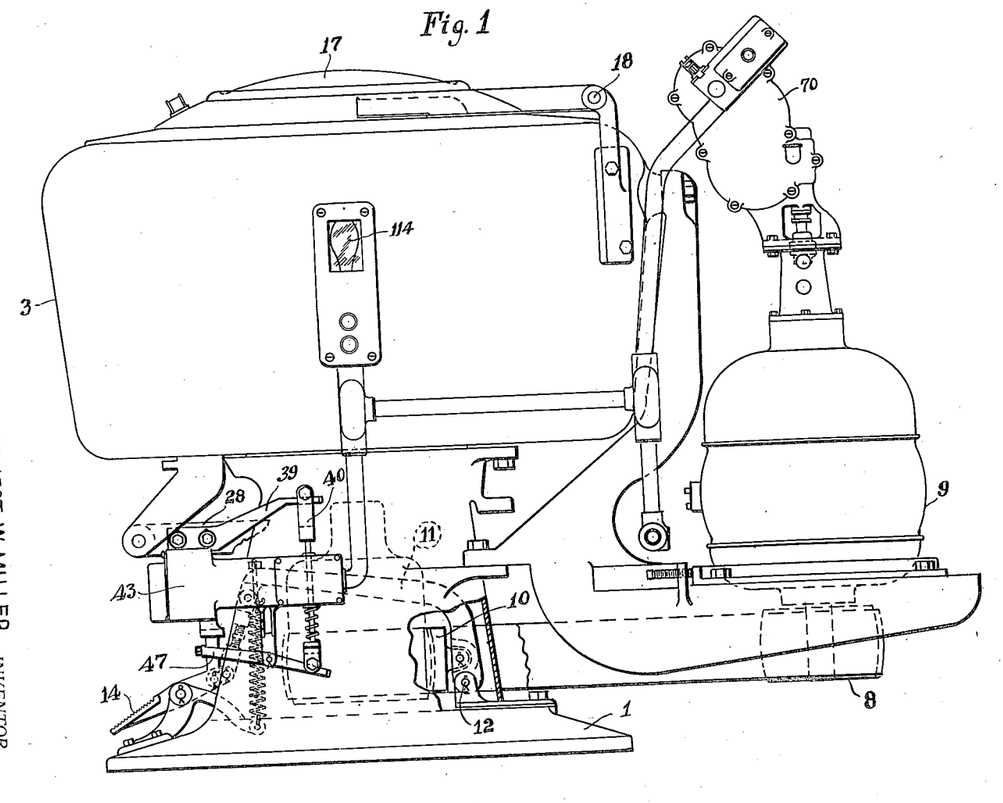
Figure 1 represents a right side elevation of the machine.
Figures 2, 3:
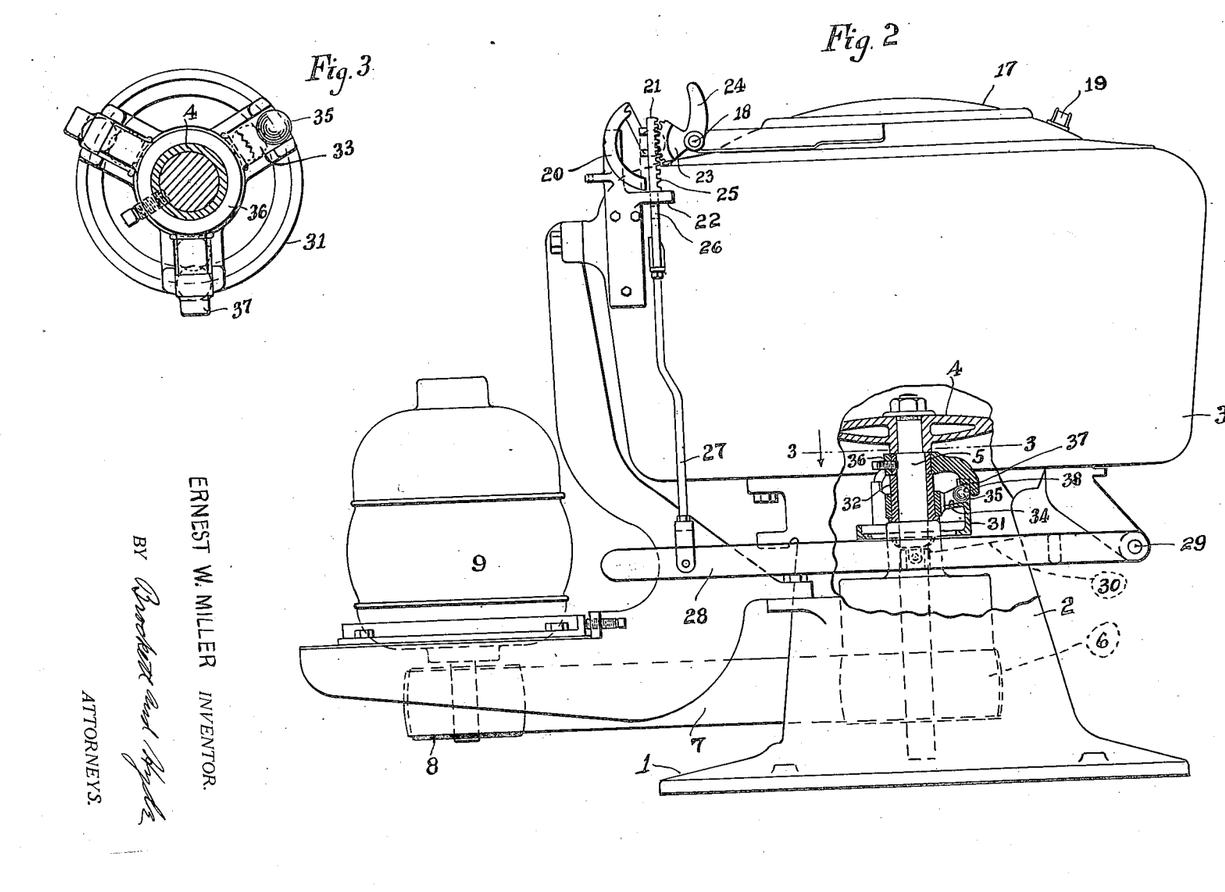
Fig. 2 is a left side elevation, partly broken out and in section, the timing mechanism being omitted.
Fig. 3 is a detailed horizontal section on the line 3—3, Fig. 2.

The jacket or casing has an open top through which the material to be treated is introduced into the basket, said top being closed by a cover 17 hinged at 18 to the casing and provided with a lifting handle 19. Suitable means is provided for preventing elevation of the cover when the machine is running, for permitting the cover to be elevated when the machine is idle, and for preventing the operator from starting the machine unless the cover is closed. For this purpose the cover is provided beyond the hinge 18, with a rearwardly extending bracket supporting an arm 20 curved around the hinge axis. In the closed position of the cover, shown in Fig. 2, the end of said arm lies opposite a blank portion of a locking slide 21 movable vertically in a guide 22 on the frame and which prevents movement of said arm or the cover connected thereto. Under certain conditions, however, as will appear, the slide 21 may be elevated to the position shown in Fig. 5 by turning a gear segment 23 having an operating handle 24 and which segment meshes with rack teeth 25 on the slide. In this position of the slide the end of arm 20 is opposite and will pass through a hole 26 in the slide, which permits the cover to be elevated.

Slide 21 is connected by a rod 27 to a lever 28 (Fig. 2) pivoted at 29 to the frame and having two yoke arms 30 provided with fiber shoes pivoted at the end of said arms, to support and control the vertical movement of a circular frame 31 having vertical sliding movement on a sleeve 32 fixed to the shaft 5. Said frame has a plurality (three being shown) of channel shaped radiating seats 33, whose bottoms are inclined outwardly and upwardly, as at 34, and support the balls 35. Above the frame 31 is a spider 36 having three arms 37, one lying over each seat 33, the outer ends of said arms having recesses 38 to receive the balls. When the machine is not running the balls 35 lie close to the shaft 5 and inwardly of the depending arms 37. Consequently frame 31 can be elevated and the slide 21 raised to release the cover. When the machine is running the balls travel radially outwardly in their seats to the position shown in Figs. 2 and 3 where they are directly under the arms 37. The frame 31 therefore cannot rise, so that slide 21 cannot be lifted and the operator is unable to release or open the cover.

Figure 4:
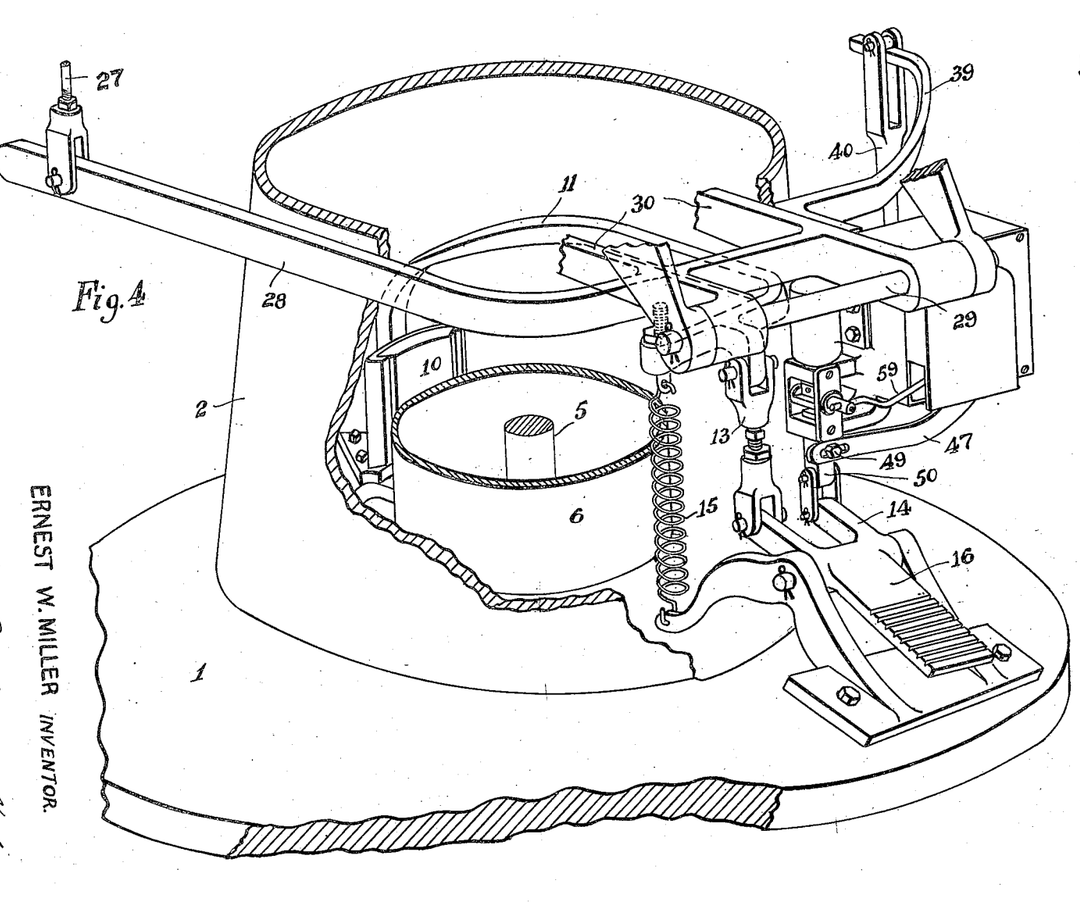
Fig. 4 is a broken out perspective view of the lower portion of the machine, showing the foot treadle control device.
Figures 5, 6, 7:
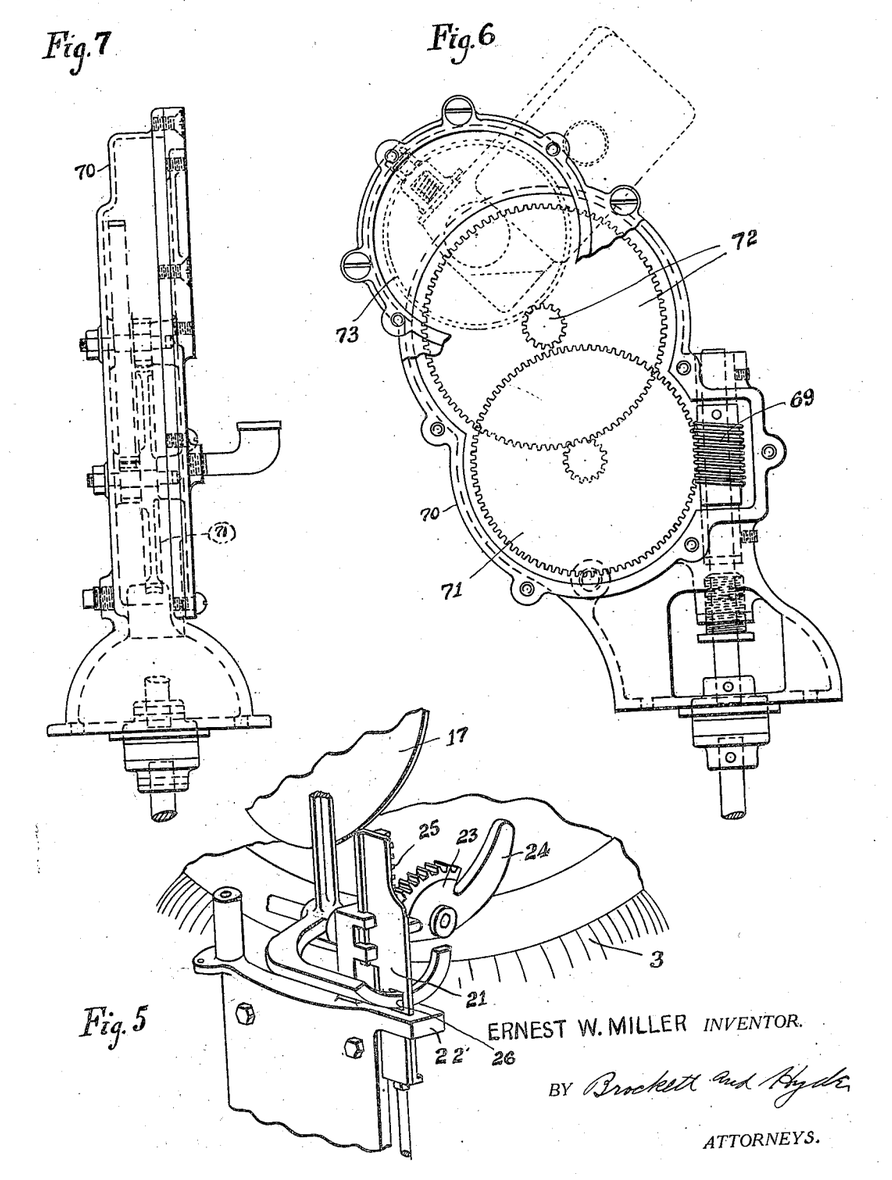
Fig. 5 is a detail perspective view showing the cover open and the locking devices therefor.
Fig. 6 is an elevation of the driving mechanism for the timing device.
Fig. 7 is an elevation from the left in Fig. 6.
Figure 8:
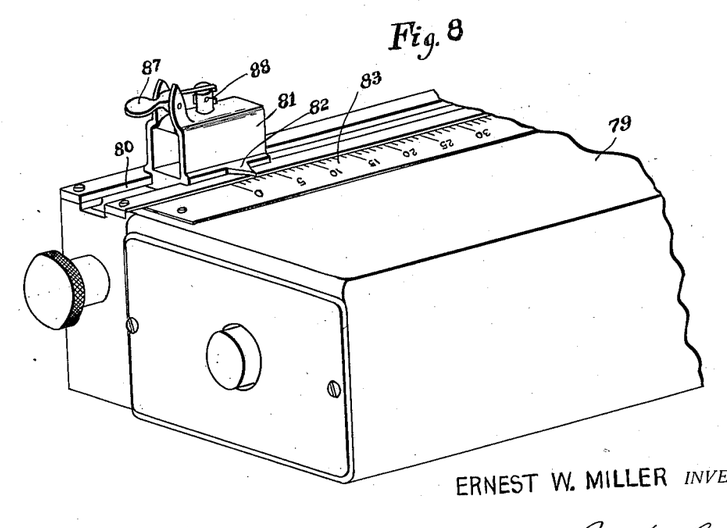
Fig. 8 is a perspective view, looking downward at the right hand end of the timing device.
Figure 9:
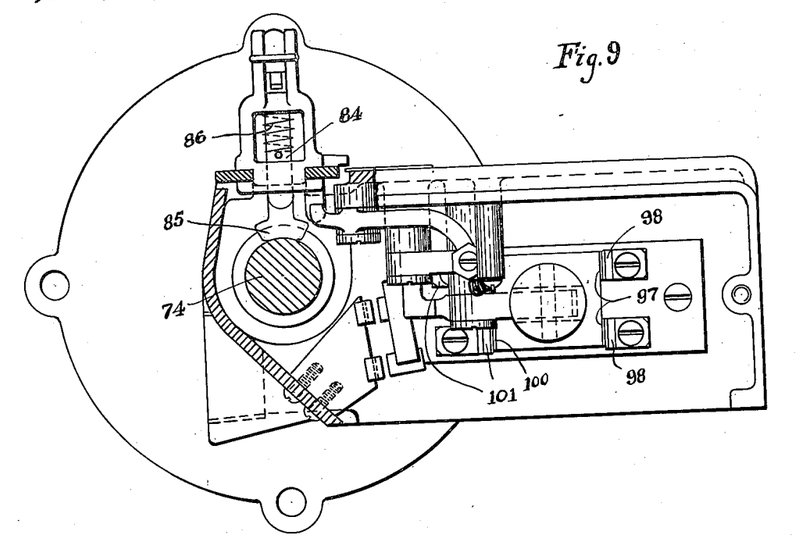
Fig. 9 is a cross section on the line 9—9, Fig. 10, looking in the direction of the arrows.

Lever 28 also is provided with a laterally extending arm 39 (Figs. 4 and 15) whose free end engages a loop or opening in the upper end of a vertically sliding switch operating rod 40. The switch controlled by said rod, to be hereafter described, is in a circuit which controls the main circuit of the motor 9. When rod 40 is elevated the switch is open. Therefore whenever the cover locking device is released, as shown in Fig. 5, the main motor circuit is open and the machine cannot be started unless the cover is closed and slide 21 and lever 28 are depressed.

Figure 15:
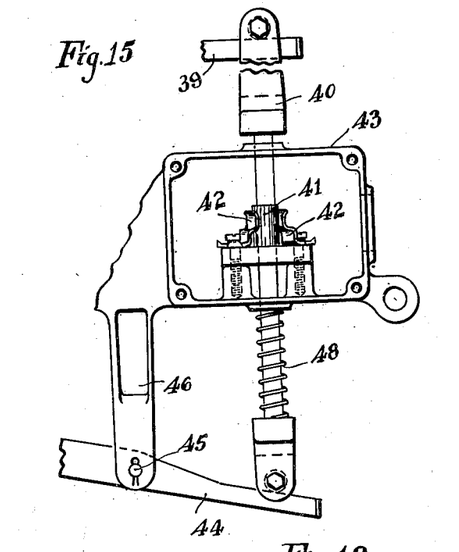
Fig. 15 is a detail side elevation of the motor controlling switch and its operating levers.
Figure 16:
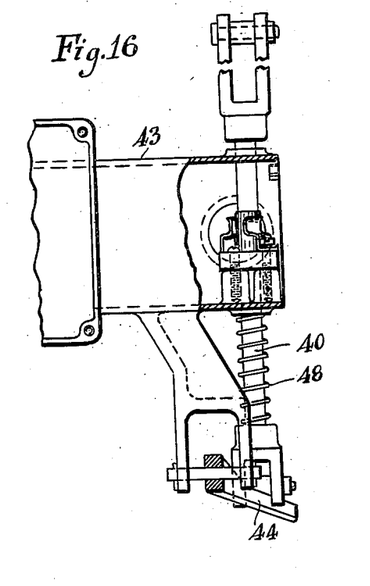
Fig. 16 is an elevation from the left in Fig. 15, the casing being partly broken out to show the switch.

Rod 40 carries an insulated sleeve 41 which in the depressed position of said rod, shown in Figs. 15 and 16, completes the circuit between two spring contacts 42 connected to the motor controlling circuit. Said rod slides vertically in guiding openings in a hollow box 43 and its lower end lies above a switch opening lever 44 pivoted at 45 on a stationary bracket 46 and having a bent arm 47 extending around beneath the box and terminating above the foot treadle 14. (See Fig. 4.) The switch is closed by a compression spring 48 and is opened or held open by either of the levers 39, 44. The front end of lever 47 is slotted to receive a bolt 49 loosely connecting said lever to a vertically slidable treadle locking bar 50 connected by links to an arm of the treadle 14. If the cover 17 is closed, so that the switch end of lever 39 has released the rod 40 depression of the foot treadle 14 also depresses the switch end of lever 44 which allows the switch 41, 42, to close.

Figure 14:
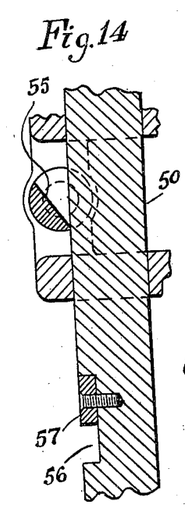
Fig. 14 is a detail view, corresponding to Fig. 12, and showing another position of the treadle locking and controlling devices.

The bar 50 slides vertically in the front portion of the hollow box 43, its upper end having a piston 51 working in a cylinder 52 and serving as a dash pot to steady and slow up the brake applying movement of the foot treadle caused by spring 15. At one side of said bar is a rotatable locking or latching shaft 53 turning in openings in a frame 54 and having its intermediate portion cut away on one side, as at 55, to form a recess to receive the bar 50 when in its depressed position, as in Fig. 14. In this position the brake is applied and the machine is not running. When the bar 50 is elevated by pressing down on the foot treadle the shaft 53 turns to the position shown in Fig. 12 and enters a recess 56 below a wear piece 57 on the bar, said shaft being turned by a tension spring 58 in the hollow box 43 connected to a bent rod 59 extending laterally from one end of the shaft and into said box. In this position shaft 53 serves as a latch to hold the foot treadle in its depressed position.

Figure 12:
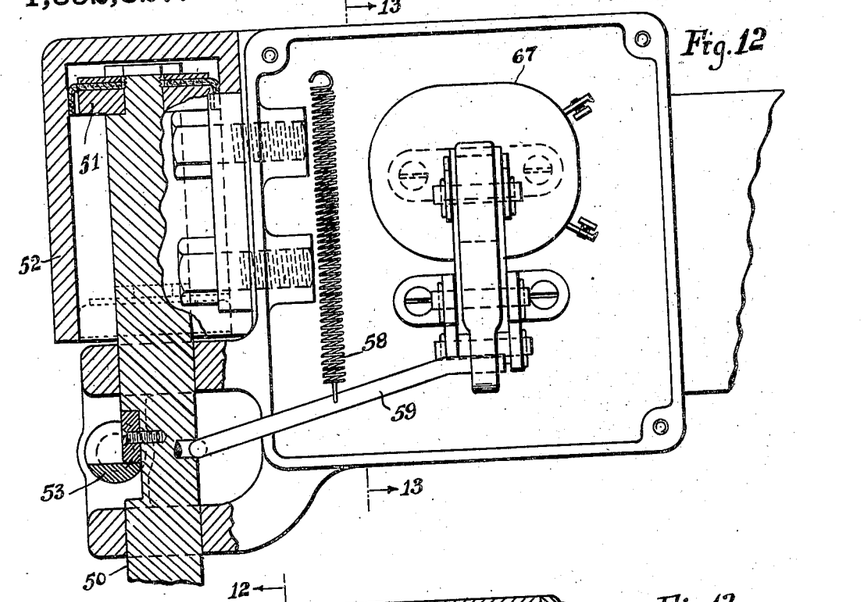
Fig. 12 is a front elevation of the treadle locking and releasing mechanism, the front cover plate being omitted and part of the view being a section on the line 12—12, Fig. 13.
Figure 13:
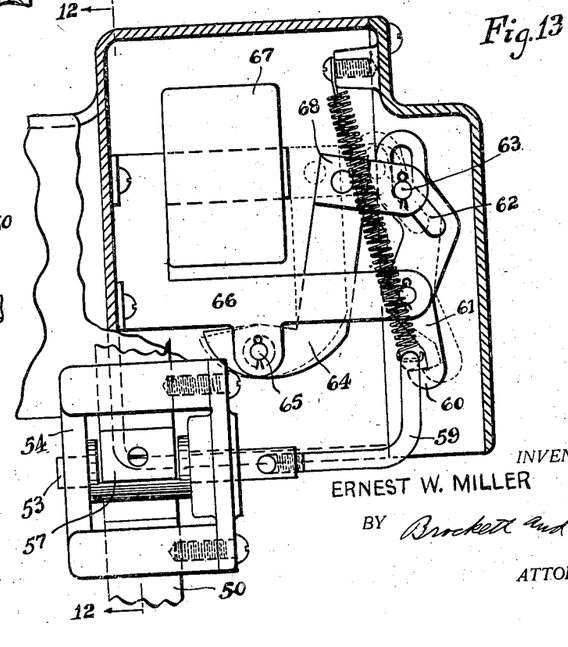
Fig. 13 is partly an elevation from the left in Fig. 12, and partly a section on the line 13—13, Fig. 12.

When the latch 53 turns to the position of Fig. 12 the free end of rod 59 passes the hooked end 60 of a lever 61 which prevents rod 59 from dropping until freed from said hook. The upper arm of said lever has a slot 62 to receive a pin 63 on a lever 64 pivoted at 65 to the frame 66 of a magnet coil 67, a portion 68 of said lever serving as the armature for said coil. When said coil is deënergized lever 64 drops to the full line position Fig. 13 and holds the latch lever 61 by gravity ready to receive the rod 59. When coil 67 is energized the armature 68 is attracted and the rod 59 is released, thereby releasing the rod 50 from latch 53 and permitting the foot treadle to rise and the brake to apply.

The circuit through the coil 67 is closed automatically to stop the machine by a timing device set by the operator when starting the machine and arranged to stop it after the lapse of any desired period.

The timing device and its operating mechanism are shown in Figs. 6 to 11, inclusive. The device is driven by the motor 9, whose shaft is coupled to the shaft of a worm 69 in a gear casing 70, and which worm drives a worm wheel 71 and a set of speed reducing gears indicated generally at 72, and the last one of which, marked 73, is rotatably mounted on the reduced end of a screw shaft 74. Gear 73 is fast with a notched wheel or ratchet 75 whose periphery is engaged by a spring pressed pawl or dog 76 on an arm 77 fixed to rotate with the screw shaft. The wheel 75 and pawl 76 form a yielding or slip connection between the screw shaft and motor drive, so that the motor will drive the screw shaft until rotation of said shaft is prevented by the stop devices to be described, whereupon the wheel 75 will rotate idly past the pawl until the motor stops, thereby preventing breakage. The screw shaft also has a head 78 on its opposite end outside of the casing 79 in which it rotates, and the slip connection enables said shaft to be rotated relative to its driving mechanism for fine setting of the timing device.

Above the screw shaft the casing is provided with a longitudinal slot 80 whose edges serve as guides for a traveler 81 provided at one side with a pointer 82 traveling along a scale 83 which may be graduated in any desired units, say minutes. In the traveler is a stem 84 terminating at its lower end in a nut segment 85 normally held engaged with the threads of the screw shaft by a pressure spring 86. The nut may however, be freed from the screw by pressing down on the thumb piece of a pivoted lever 87 connected at 88 to the outer end of rod 84, which enables the traveler to be adjusted to any desired position along its path of movement and coupled to the screw shaft, for determining the period of operation of the machine.

Figures 10, 11:
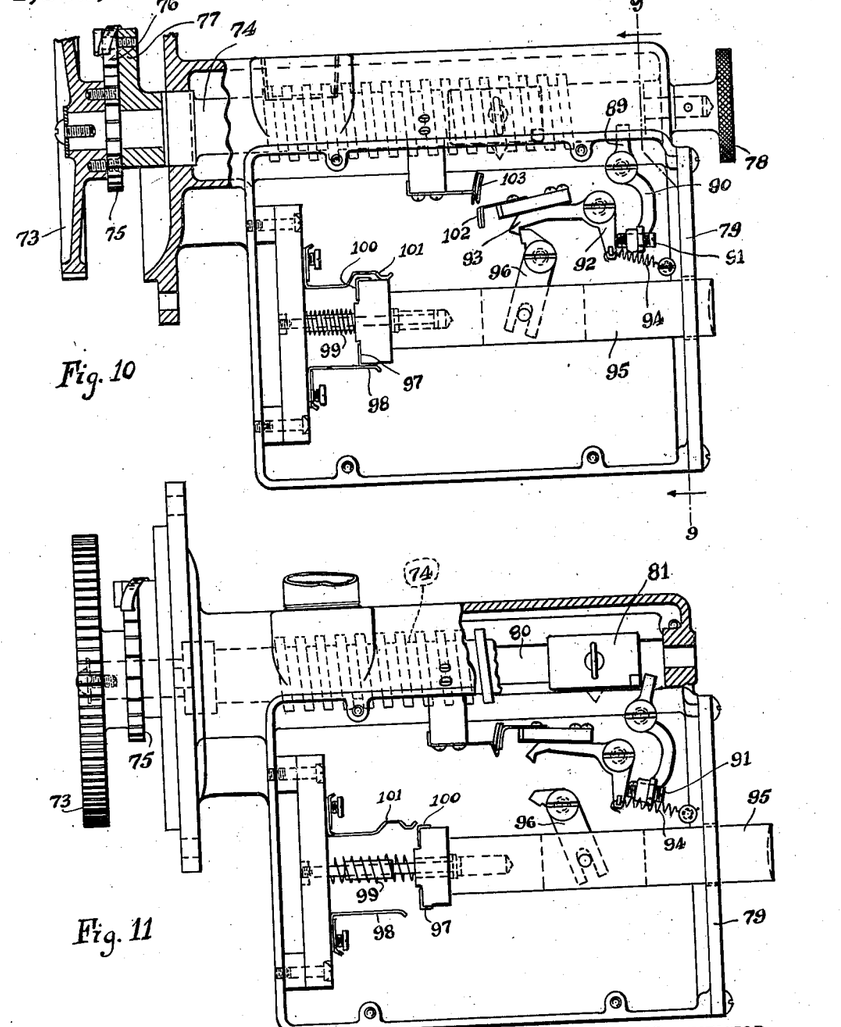
Fig. 10 is a bottom plan view of the timing device, the bottom cover plate being omitted; and showing the parts in their positions when the machine is running.
Fig. 11 is a similar view, showing the parts in their positions when the machine has been stopped.

Operation of the machine causes the traveler to move along the screw shaft until it engages the short arm 89 of a lever 90 whose other arm is provided with an adjustable abutment screw 91 engaging one arm of a pivoted latch lever 92, the other arm of which has a latch hook 93 normally held down by a tension spring 94 in the position shown in Fig. 10. After setting the traveler to the proper time position, as described, the time control button 95 is pushed in, which oscillates a small stop lever 96 past the latch hook 93 to the holding position, Fig. 10. In this position a contact 97 on the button closes a circuit across two contacts 98 which are in the same motor controlling circuit including the switch 41, 42. Unless this circuit is completed the motor cannot be started. When lever 90 is oscillated by the traveler the time control button is released from the hook 93 and forced out by its spring 99, causing a second contact 100 on said button to momentarily engage two contacts 101 in circuit with the solenoid 67, thereby energizing said solenoid which, as before described, applies the brake and also opens the switch 41, 42 in the motor controlling circuit, thereby stopping the machine. Simultaneously an insulated contact 102 on the lever 92 engages two contacts 103 in a supplemental circuit (Fig. 21) containing a battery 104 and alarm such as the bell 105, which rings until the machine is again filled, set and started, and is a constant reminder that the machine awaits attention.

Figures 17, 19, 20:
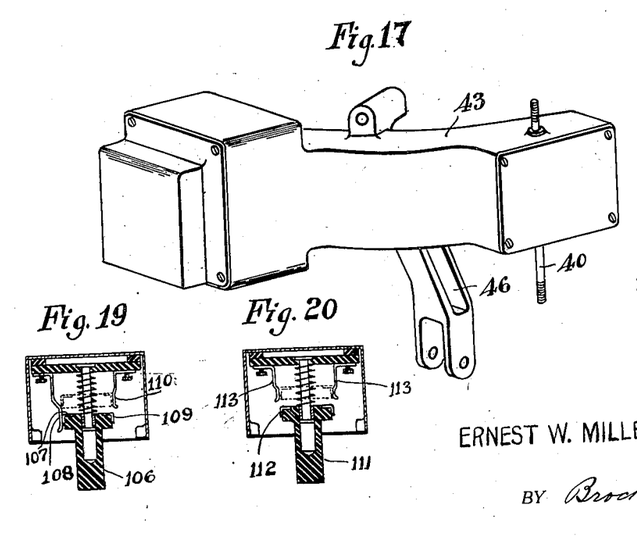
Fig. 17 is a perspective view of the switch inclosing casing.
Fig. 19 is a detail section on the line 19—19, Fig. 18.
Fig. 20 is a detail section on the line 20—20, Fig. 18.
Figure 18:
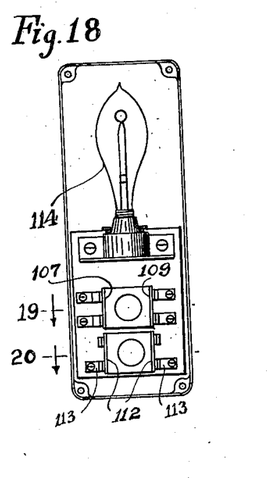
Fig. 18 is an elevation of the main starting and stopping switch device, the casing cover being omitted.

Figs. 18, 19 and 20 illustrate the "start" and "stop" buttons or switches. As shown the "stop" button 106 carries two contacts of which one, marked 107, coöperates with two contacts 108 in circuit with the switches 41, 42 and 97, 98, while the other, marked 109, coöperates with two contacts 110, in circuit with the solenoid 67. The "start" button 111 has a single contact 112 coöperating with two contacts 113 in a starting circuit to be referred to. 114 represents a signal lamp which is lighted when the machine is running and indicates its operating condition.

Figure 21:
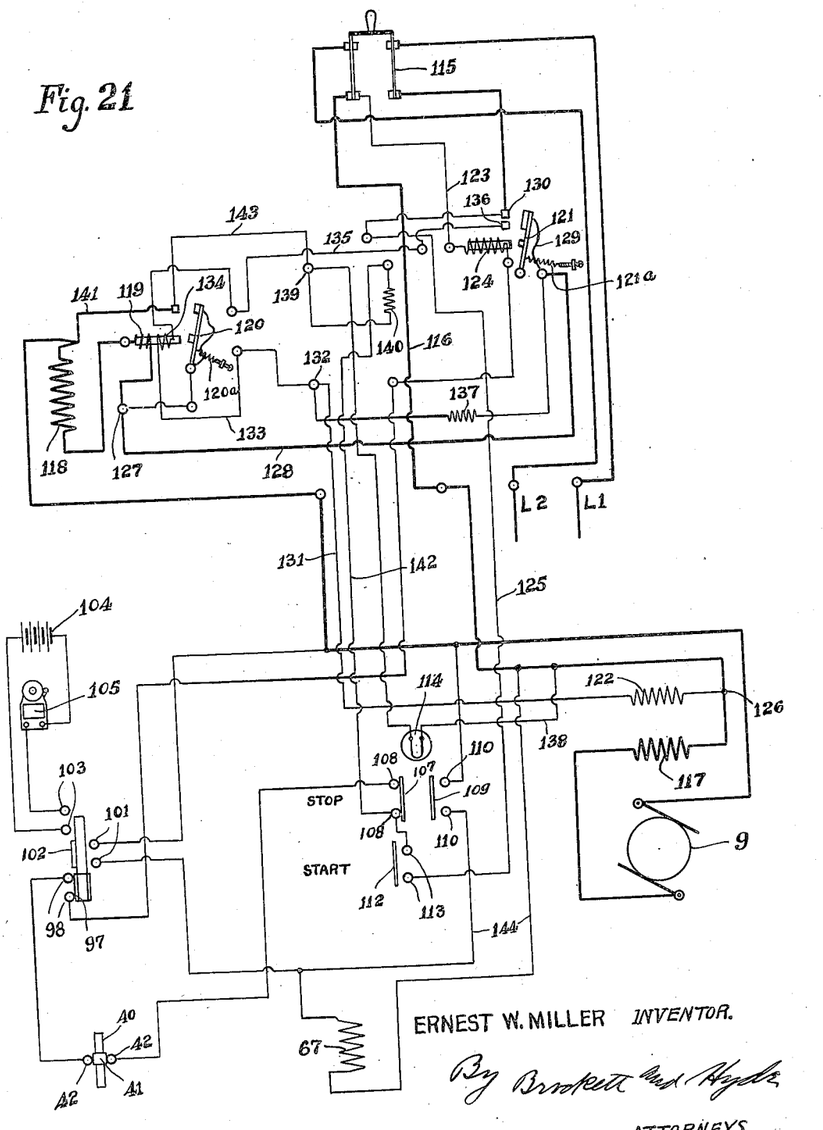
Fig. 21 is a diagrammatic view of the electrical circuits.

The extractor described operates as follows: Referring to Fig. 21, L¹ and L² represent the main current leads, the circuit across which is closed by the line switch 115. Heavy line 116 represents the main circuit to the motor 9, including the field coil 117 and the heavy resistance 118, as well as a lock out coil 119 on the core of an electromagnet which controls a normally open switch 120 to be referred to, said circuit reaching the other side of the line through the normally open main motor circuit controlling switch 121. 122 represents the shunt field coil. The light line 123 represents what may be called a primary circuit, in other words the circuit before referred to which controls the main motor circuit. This circuit 123 includes the coil 124 of an electromagnet operating the main motor switch 121.

When the alarm bell 105 rings the operator knows that the machine is stopped. He thereupon resets the timing mechanism by moving to its proper position the traveler 81, allowing the latch lever 92 to be turned by the spring 94, thereby opening the switch 102, 103, and breaking the circuit of the alarm bell 105 and stopping the same. Latch lever 93 is then in position to latch and hold the time controlled button 95 when pushed in. Said button is then pushed in, closing the circuit 123 through the contacts 97 and 98. The treadle 16 is then depressed, which releases the brake and allows the spring 48 to close the switch 41, 42, completing the circuit 123 to the contact 108 of the stop button. The brake is held released by the mechanism shown in Figs. 12 and 13, awaiting energization of the magnet coil 67 for releasing the brake holding latch and causing application of the brake. The circuit through coil 67 is simultaneously broken at the contacts 101. The operator now presses the starting button 111, completing a circuit from the point 108 across the contacts 112 and 113, thence through wire 125 to the other side of the line. Final completion of this motor control circuit 123, 125, energizes coil 124, which attracts its armature and closes the main motor switch 121. Current then flows as follows: from the main line switch by way of wire 116 to the point 126, where the current divides, one branch proceeding by way of series field 117, motor 9, resistance 118, and lock out coil 119 to the point 127; thence by way of wire 128, through switch wire 129 to the contact 130, and to the other side of the line. The other branch of the circuit is through the shunt field coil 122 and by way of wire 131 to the point 132, where the current again divides, part proceeding by way of wire 133 to a shunt coil 134 on the same core as the lock out coil 119, but the winding of which is reversed as regards the coil 119 so as to oppose the same in its electromagnetic effect. From the coil 134 the current proceeds by way of wire 135 to the point 136, and thence by way of the contact point of switch 121 to the point 130. The other branch of this circuit from point 132 is by way of a holding resistance 137 to the switch wire 129. This holding resistance limits the current in the coil 134 to safe value. While said coil receives full voltage at the time of operation it will not stand it continuously and is therefore limited by the resistance 137.

Current also flows from the motor lead 116 by way of wire 138 to the lamp 114, thence to the point 139 and by way of resistance 140 to the point 108 and by wire 125 to the other side of the line. This lights the lamp and the resistance 140 dims the lamp at the moment of starting.

The conditions just established must be maintained for an appreciable time, say 15 seconds or so, in order to keep the machine running. This period is necessary to effect the closure of the switch 120 establishing a permanent circuit through the coil 124 so as to maintain the main motor circuit in closed condition. Starting button 111 is a spring pressed button which flies out and separates the contacts 112, 113, as soon as it is released, the purpose of this construction being to insure that the operator stays by the machine for an appreciable time until it gets to running well, and compelling him to observe it long enough to be sure that it is safely operating. If he leaves too soon the machine will automatically stop because the permanent circuit has not been completed.

Assuming that the operator keeps his finger on the starting button for the proper length of time the motor picks up speed and the current drops to a predetermined value capable of variation by manipulating the adjustment of the tension of the opening spring 120ª of switch 120. When the starting button is first pressed current flows through both of the coils 119 and 134, but said coils are opposed in effect. Coil 134 tends to attract the armature and close the switch, while coil 119 tends to repel the armature and open the switch. At the moment of starting the effect of coil 119 predominates and the switch remains open, but when current drops, as stated, the effect of lockout coil 119 is reduced to such an extent that coil 134 becomes preponderating and closes switch 120, thereby short circuiting the resistance 118 by way of wire 141 and switch 120 to the point 127, the motor thereupon coming across the line and running at normal speed. Lock out coil 119 is also short circuited and coil 134 exerts maximum holding effect, maintaining switch 120 closed. The operator can therefore safely remove his finger from the starting button and the motor will continue to operate, due to the establishment of a secondary holding circuit from the point 108 by way of wire 142, and resistance 140 to the point 139, thence by way of wire 143 and switch 120 to the other side of the line. A new circuit is also established for the signal lamp 114, the current from which passes from said lamp to the point 139 and thence by way of switch 120 to the other side of the line.

The machine may be stopped in either of two ways, first by hand, and second automatically. Both methods of stopping the machine bring it to rest by applying the brake and opening the main motor circuit, while the automatic stopping device also rings the alarm bell. If the stop button 106 is pressed the permanent motor controlling circuit 123, 142 is broken at the contacts 107, 108, thereby deënergizing magnet coil 124 and allowing the main motor circuit switch 121 to be opened by its spring 121ª. Also, the second set of contacts 109, 110, of the stop button momentarily close a circuit 144 through the solenoid 67 and across the motor before the permanent motor controlling circuit is broken at the contacts 107, 108. Energization of coil 67 operates the mechanism shown in Figs. 12 and 13 and releases the brake for application to slow down the rotation of the basket.

If the time controlled switch automatically operates by its traveler 81 reaching the end of its stroke, the permanent motor controlling circuit 116, 142, is broken at the contacts 97, 98, but before said circuit is broken a shunt circuit is established as before, through the solenoid 67 by way of contacts 100, 101, producing the same effect as by pressing the stop button. The subsidiary alarm circuit is also reëstablished.

The machine described, together with the circuits controlling the same, is very efficient and safe in operation. The machine can not be started until all of its parts have been properly adjusted by the operator and are in condition for working. The machine will not continue to operate unless the operator stays by it long enough to see that it is operating properly, and if, in attempting to start the machine, he perceives that it is unevenly loaded it can be readily stopped to balance the load. The cover can not be opened while the machine is running, nor can the machine be started while the cover is open. The automatic brake also gradually slows down the rotation of the basket so as to prevent strain upon the working parts. Other advantages of the invention will readily occur to those skilled in the art and it is to be understood that the invention is not limited by the particular embodiment thereof shown in the drawings or described in the foregoing specification, but covers any modifications and variations therein within the scope of the claims appended hereto.

What I claim is:—

1. An extractor, comprising a rotating basket, an electric motor for driving the same, a motor circuit including a switch, a controlling circuit for actuating said switch and including a second switch, said controlling circuit when completed closing said motor switch, a brake for said basket, and a cover for closing the opening to said basket, said second switch being controlled by either said brake or cover.

2. An extractor, comprising a rotating basket, power means for rotating the same, adjustable means arranged to cut off the power from said driving means after a predetermined period whose duration is under the control of the operator, and means for preventing actuation of said machine unless said power cut off means is set.

3. An extractor, comprising a rotating basket, power driving means therefor, a time control device for cutting off the power from said driving means after a predetermined period, a friction brake for said basket, and means operated by said time control means for causing application of said brake to stop the machine.

4. An extractor, comprising a rotating basket, means for rotating the same, a time control device for stopping the machine after a predetermined period, a brake for said basket, a cover closing the opening to said basket, and means for preventing operation of said machine unless the cover is closed, the brake is released, and the time control device is set.

5. An extractor, comprising a rotating basket, means for rotating the same, a time control device for stopping the machine after a predetermined period, a brake for said basket, a cover closing the opening to said basket, means for preventing operation of said machine unless the cover is closed, the brake is released, and the time control device is set, and means for producing an application of the brake when the time control device operates.

6. An extractor, comprising a rotating basket, an electric motor for rotating said basket, a motor circuit including a normally open switch, an electromagnet for closing said switch, a starting circuit including said electromagnet, and a normally open starting button, and means arranged to establish a permanent circuit through said electromagnet for holding the main motor circuit switch closed when said starting button is held closed for a predetermined period.

In testimony whereof I affix my signature.

ERNEST W. MILLER.